United States Patent [19]

Davis et al.

[11] Patent Number: 4,660,435
[45] Date of Patent: Apr. 28, 1987

[54] FIBER COMPOSITE FLYWHEEL RIM

[75] Inventors: Donald E. Davis, Thousand Oaks; Kenneth T. Ingham, Woodland Hills, both of Calif.

[73] Assignee: Rockwell International Corporation, El Segundo, Calif.

[21] Appl. No.: 267,323

[22] Filed: May 26, 1981

[51] Int. Cl.⁴ .............................................. F16F 15/30
[52] U.S. Cl. ...................................... 74/572; 474/197
[58] Field of Search ................. 74/572, 573; 474/195, 474/196, 197, 902, 260; 156/172, 173, 175

[56] References Cited

U.S. PATENT DOCUMENTS

| | | | |
|---|---|---|---|
| 2,995,938 | 8/1961 | Brodersen | 74/572 |
| 3,496,799 | 2/1970 | Call | 74/572 |
| 3,977,273 | 8/1976 | Ernst et al. | 156/172 |
| 4,181,217 | 1/1980 | Huls et al. | 474/197 |
| 4,187,738 | 2/1980 | Knight, Jr. et al. | 74/572 |
| 4,198,878 | 4/1980 | Lewis et al. | 74/572 |

Primary Examiner—Werner H. Schroeder
Assistant Examiner—Steven N. Meyers
Attorney, Agent, or Firm—H. Fredrick Hamann; Harry B. Field

[57] ABSTRACT

A flywheel 2 comprising a hub 4 having at least one radially projecting disc 6, an annular rim 14 secured to said disc and providing a surface circumferential to said hub, a first plurality of resin-impregnated fibers 22 wound about said rim congruent to said surface, and a shell 26 enclosing said first plurality of fibers and formed by a second plurality of resin-impregnated fibers wound about said rim tangentially to said surface.

4 Claims, 2 Drawing Figures

FIBER COMPOSITE FLYWHEEL RIM

The Government has rights in this invention pursuant to Contract No. DE- ACO4-76-DP-00789 awarded by the U.S. Department of Energy.

BACKROUND OF THE INVENTION

1. Field of the Invention

This invention relates to flywheels, and is particularly directed to a fiber composition rim for flywheels.

2. Description of the Prior Art

Traditionally, flywheels have been massive devices which have relied upon their mass to store energy. For example, the flywheels of automobile engines typically weigh about 50 to 100 pounds and rotate at several hundred rpm. More recently, it has been recognized that the equation which defines the amount of energy stored by a flywheel is equal to the mass times the square of the velocity. In accordance with this, attempts have been made to increase the energy stored in flywheels by increasing the speed of rotation of the flywheel. Unfortunately, this also increases the centrifugal forces which tend to cause the flywheel to fly apart with explosive results. Consequently, current flywheel research has been directed toward designing low-weight, high-velocity flywheels. Thus, modern flywheels are designed for rotational speeds of 10,000–20,000 rpm. However, no flywheel structures have been proposed heretofore which are capable of withstanding prolonged rotation at these speeds. Consequently, the search for improved flywheel structures has continued.

SUMMARY OF THE INVENTION

The disadvantages of the prior art are overcome with the present invention and a flywheel design is proposed which is extremely light in weight and economical to produce, yet is extremely strong and resistant to centrifugal forces at high rates of revolution.

The advantages of the present invention are preferably attained by providing a flywheel comprising a hub having at least one radially projecting disc, an annular rim secured to the disc and providing a circumferential surface, a first plurality of resin-impregnated fibers wound about the rim congruent to the surface, and a shell enclosing the first plurality of fibers and formed by a second plurality of resin-impregnated fibers wound about the rim tangentially to the surface.

OBJECTS OF THE INVENTION

Accordingly, it is an object of the present invention to provide an improved flywheel.

Another object of the present invention is to provide a light-weight flywheel which is strong enough to withstand prolonged rotation at high speeds.

A specific object of the present invention is to provide a flywheel comprising a hub having at least one radially projecting disc, an annular rim secured to the disc and providing a circumferential surface, a first plurality of resin-impregnated fibers wound circumferentially about the rim congruent to the surface. The flywheel may incorporate a shell enclosing the first plurality of fibers and formed by a second plurality of resin-impregnated fibers wound about the rim tangentially to the surface.

These and other objects and features of the present invention will be apparent from the following detailed description, taken with reference to the accompanying drawings.

DETAILED DESCRIPTION OF THE PREFERRED EMBODIMENT

Figure 1:
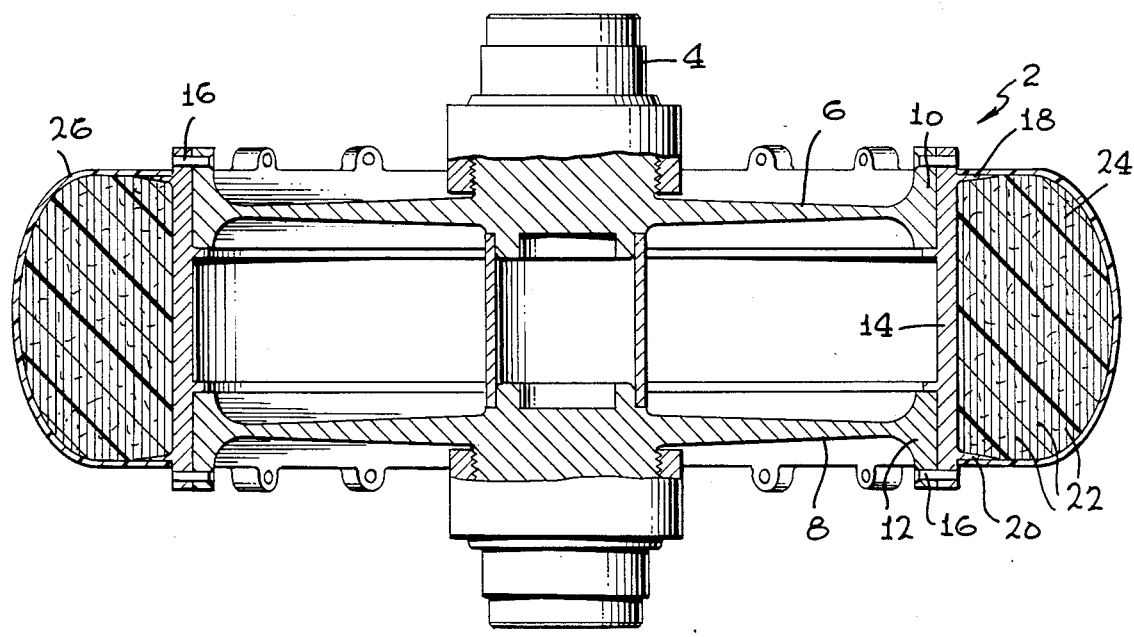
FIG. 1 is a vertical section through a flywheel embodying the present invention.
Figure 2:
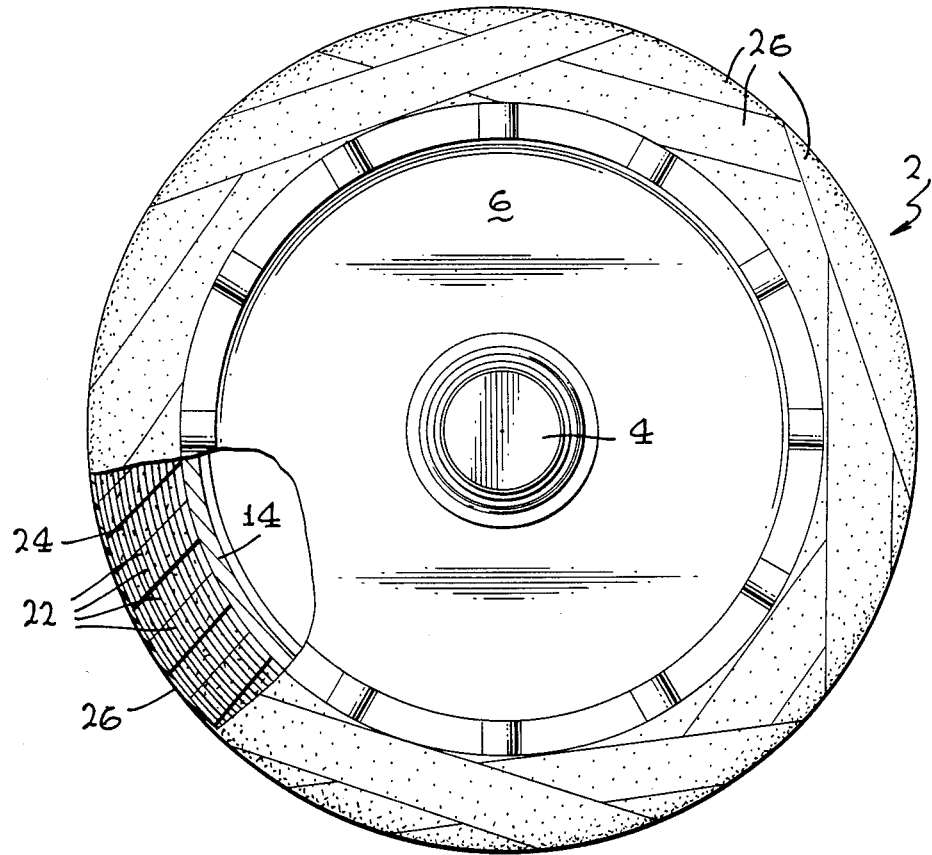
FIG. 2 is a plan view of the flywheel of FIG. 1 with part of the shell broken away for clarity.

FIG. 1 shows an embodiment of the invention comprising a flywheel, indicated generally at 2, having a hub 4 with upper and lower discs 6 and 8 projecting radially therefrom. The discs 6 and 8 are each provided with peripheral flanges 10 and 12 and an annular rim 14 extends about the circumference of the discs 6 and 8, and is secured to the flanges 10 and 12 by suitable means, such as radial pins 16. The hub 4, discs 6 and 8 and rim 14 are, preferably, formed of rigid, high-strength material, such as metal. A pair of outwardly tapering ridges 18 and 20 project radially adjacent the upper and lower edges of the rim 14. A plurality of light-weight, high-strength filaments 22 are wound circumferentially about the rim 14 to a radial thickness approximately equal to half the width of the rim 14. The filaments may be formed of any suitable material, such as glass fibers, piano wire, etc., and are preferably bound in a matrix 24 of suitable bonding agent, such as metal, resin, plastic or a combination. Overwrapping the filaments 22 and matrix 24 is an outer layer 26 of fibers wound tangentially with respect to the rim 14 and impregnated with a suitable bonding agent, similar to that of matrix 24.

In use, an external power source (not shown) is applied to hub 4 to rotate the flywheel 2. As the rate of rotation increases, centrifugal force will tend to cause the discs 6 and 8 and rim 14 to expand radially outward, due to their relatively high mass. However, any such tendency will serve to place the filaments 22 and those of outer layer 26 in tension, which will resist radial expansion. Consequently, the flywheel 2 of the present invention is capable of sustained operation at substantially higher rotational speeds than have been possible with prior-art flywheels.

Obviously, numerous variations and modifications may be made without departing from the present invention. Accordingly, it should be clearly understood that the form of the present invention described above and shown in the accompanying drawing is illustrative only, and is not intended to limit the scope of the invention.

What is claimed and desired to be secured by Letters Patent of the United States is:

1. A flywheel comprising:
   a hub having at least one radially projecting disc;
   an annular rim secured to said disc and providing a surface circumferential to said hub;
   a first plurality of bonding-agent-impregnated fibers wound circumferentially about said rim parallel to said surface; and
   a shell enclosing said first plurality of fibers and formed by a second plurality of bonding-agent-impregnated fibers wound about the outside surface of said first plurality of fibers in a plurality of individual overlapping segments, the general direction of the fibers in each segment being tangential to said rim surface.

2. The flywheel of claim 1 wherein said hub has two discs spaced axially along said hub, and said rim is secured to both of said discs and bridges the space between said discs.

3. The flywheel of claim 1 wherein said disc has a cross-section which tapers outwardly from said hub and a circumerentially enlarged flange extending about the periphery of said disc.

4. The flywheel of claim 1, wherein: said bonding agent is resin.

* * * * *